US012308924B2

(12) United States Patent
Deghel et al.

(10) Patent No.: US 12,308,924 B2
(45) Date of Patent: May 20, 2025

(54) DEVICES, METHODS AND APPARATUSES FOR SPATIAL ADAPTATION

(71) Applicant: NOKIA TECHNOLOGIES OY, Espoo (FI)

(72) Inventors: Matha Deghel, Montrouge (FR); Youngsoo Yuk, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/920,138

(22) Filed: Oct. 18, 2024

(65) Prior Publication Data
US 2025/0047354 A1  Feb. 6, 2025

Related U.S. Application Data

(63) Continuation of application No. PCT/EP2023/085995, filed on Dec. 15, 2023.

(30) Foreign Application Priority Data

Feb. 2, 2023  (GB) ..................................... 2301498

(51) Int. Cl.
*H04W 24/10* (2009.01)
*H04B 7/06* (2006.01)
*H04W 52/02* (2009.01)

(52) U.S. Cl.
CPC ......... *H04B 7/0691* (2013.01); *H04B 7/0626* (2013.01); *H04W 24/10* (2013.01); *H04W 52/0206* (2013.01)

(58) Field of Classification Search
CPC ... H04B 7/0691; H04B 7/0626; H04W 24/10; H04W 52/0206
See application file for complete search history.

(56) References Cited

U.S. PATENT DOCUMENTS

2021/0029555 A1\* 1/2021 Zhou .................... H04B 7/0665
2022/0022071 A1\* 1/2022 Leather ................ H04B 7/0452

OTHER PUBLICATIONS

International Search Report and Written Opinion dated Mar. 19, 2024 corresponding to International Patent Application No. PCT/EP2023/085995.
Ericsson, "Network energy saving techniques," 3GPP Draft; R1-2209859, 3GPP TSG RAN WG1 #110bis-e, e-Meeting, Oct. 10-19, 2022, Sep. 30, 2022, XP052259332.
Samsung, "Network energy saving techniques," 3GPP Draft; R1-2212057, 3GPP TSG RAN WG1 #111, Toulouse, France, Nov. 14-18, 2022, Nov. 7, 2022, XP052222622.

\* cited by examiner

*Primary Examiner* — Chuong A Ngo
(74) *Attorney, Agent, or Firm* — SQUIRE PATTON BOGGS (US) LLP

(57) ABSTRACT

Embodiments of the present disclosure disclose devices, methods and apparatuses for spatial adaption. A terminal device obtains a spatial pattern configuration of reference signal transmission from a network device. The spatial pattern configuration is indicative of whether a plurality of spatial patterns have different energy levels. The terminal device then transmits a measurement report to a network device. The measurement report comprises one or more spatial patterns measured by the terminal device based on the spatial pattern configuration.

20 Claims, 8 Drawing Sheets

DEVICES, METHODS AND APPARATUSES FOR SPATIAL ADAPTATION

CROSS-REFERENCE TO RELATED APPLICATION

This application is a Continuation of International Patent Application No. PCT/EP2023/085995, filed Dec. 15, 2023, which claims priority from GB Application No. 2301498.8, filed Feb. 2, 2023, the contents of which are hereby incorporated by reference in their entirety.

FIELD

Embodiments of the present disclosure generally relate to the field of communication, and in particular, to devices, methods, apparatuses and computer readable storage medium for spatial adaptation.

BACKGROUND

Network energy saving is of great importance for environmental sustainability, to reduce environmental impact (greenhouse gas emissions), and for operational cost savings. As new radio (NR), also known as fifth-generation technology standard for broadband cellular networks (5G), is becoming pervasive across industries and geographical areas, handling more advanced services and applications requiring very high data rates, networks are being denser, use more antennas, larger bandwidths and more frequency bands, which means an increasing energy consumption.

Therefore, the environmental impact of 5G and the operational operating expense need to stay under control, and improved solutions for energy saving in 5G need to be further investigated and improved.

SUMMARY

In general, example embodiments of the present disclosure provide devices, methods, apparatuses and computer readable storage medium for channel state information (CSI) measurement and reporting framework for spatial adaption.

In a first aspect, there is provided a terminal device. The terminal device may comprise one or more transceivers; and one or more processors coupled to the one or more transceivers, wherein the one or more transceivers are configured with the one or more processor to cause the terminal device to: obtain a spatial pattern configuration of reference signal transmission from a network device, the spatial pattern configuration being indicative of whether a plurality of spatial patterns have different energy levels; and transmit a measurement report to a network device, wherein the measurement report comprises one or more spatial patterns measured by the terminal device based on the spatial pattern configuration.

In a second aspect, there is provided a network device. The network device may comprise one or more transceivers; and one or more processors coupled to the one or more transceivers, and the one or more transceivers are configured with the one or more processor to cause the network device to: transmit, to a terminal device, a spatial pattern configuration of reference signal transmission from the network device, the spatial pattern configuration being indicative of whether a plurality of spatial patterns have different energy levels; and receive, from the terminal device, a measurement report, wherein the measurement report comprises one or more spatial patterns measured by the terminal device based on the spatial pattern configuration.

In a third aspect, there is provided a method at a terminal device. The method may comprise: obtaining a spatial pattern configuration of reference signal transmission from a network device, the spatial pattern configuration being indicative of whether a plurality of spatial patterns have different energy levels; and transmitting a measurement report to a network device, wherein the measurement report comprises one or more spatial patterns measured by the terminal device based on the spatial pattern configuration.

In a fourth aspect, there is provided a method at a network device. The method may comprise: transmitting, to a terminal device, a spatial pattern configuration of reference signal transmission from the network device, the spatial pattern configuration being indicative of whether a plurality of spatial patterns have different energy levels; and receiving, from the terminal device, a measurement report, wherein the measurement report comprises one or more spatial patterns measured by the terminal device based on the spatial pattern configuration.

In a fifth aspect, there is provided an apparatus of a terminal device. The apparatus may comprise: means for obtaining a spatial pattern configuration of reference signal transmission from a network device, the spatial pattern configuration being indicative of whether a plurality of spatial patterns have different energy levels; and means for transmitting a measurement report to a network device, wherein the measurement report comprises one or more spatial patterns measured by the terminal device based on the spatial pattern configuration.

In a sixth aspect, there is provided an apparatus of a network device. The apparatus may comprise: means for transmitting to a terminal device, a spatial pattern configuration of reference signal transmission from the network device, the spatial pattern configuration being indicative of whether a plurality of spatial patterns have different energy levels; and means for receiving, from the terminal device, a measurement report, wherein the measurement report comprises one or more spatial patterns measured by the terminal device based on the spatial pattern configuration.

In a seventh aspect, there is provided a terminal device. The terminal device may comprise at least one processor; and at least one memory including computer program codes, wherein the at least one memory and the computer program codes are configured to, with the at least one processor, cause the terminal device to: obtain a spatial pattern configuration of reference signal transmission from a network device, the spatial pattern configuration being indicative of whether a plurality of spatial patterns have different energy levels; and transmit a measurement report to a network device, wherein the measurement report comprises one or more spatial patterns measured by the terminal device based on the spatial pattern configuration.

In an eighth aspect, there is provided a network device. The network device may comprise at least one processor; and at least one memory including computer program codes, wherein the at least one memory and the computer program codes are configured to, with the at least one processor, cause the network device to: transmit, to a terminal device, a spatial pattern configuration of reference signal transmission from the network device, the spatial pattern configuration being indicative of whether a plurality of spatial patterns have different energy levels; and receive, from the terminal device, a measurement report, wherein the measurement report comprises one or more spatial patterns measured by the terminal device based on the spatial pattern configuration.

In a ninth aspect, there is provided a non-transitory computer readable medium comprising program instructions for causing an apparatus to perform at least the method according to third or fourth aspect.

In a tenth aspect, there is provided a computer program comprising instructions, which, when executed by an apparatus, cause the apparatus at least to: obtain a spatial pattern configuration of reference signal transmission from a network device, the spatial pattern configuration being indicative of whether a plurality of spatial patterns have different energy levels; and transmit a measurement report to a network device, wherein the measurement report comprises one or more spatial patterns measured by the terminal device based on the spatial pattern configuration.

In an eleventh aspect, there is provided a computer program comprising instructions, which, when executed by an apparatus, cause the apparatus at least to: transmit, to a terminal device, a spatial pattern configuration of reference signal transmission from the network device, the spatial pattern configuration being indicative of whether a plurality of spatial patterns have different energy levels; and receive, from the terminal device, a measurement report, wherein the measurement report comprises one or more spatial patterns measured by the terminal device based on the spatial pattern configuration.

In a twelfth aspect, there is provided a terminal device. The terminal device may comprise obtainment circuitry configured to obtain a spatial pattern configuration of reference signal transmission from a network device, the spatial pattern configuration being indicative of whether a plurality of spatial patterns have different energy levels; and transmitting circuitry configured to transmit a measurement report to a network device, wherein the measurement report comprises one or more spatial patterns measured by the terminal device based on the spatial pattern configuration.

In a thirteenth aspect, there is provided a network device. The network device may comprise transmitting circuitry configured to transmit, to a terminal device, a spatial pattern configuration of reference signal transmission from the network device, the spatial pattern configuration being indicative of whether a plurality of spatial patterns have different energy levels; and receiving circuitry configured to receive, from the terminal device, a measurement report, wherein the measurement report comprises one or more spatial patterns measured by the terminal device based on the spatial pattern configuration.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
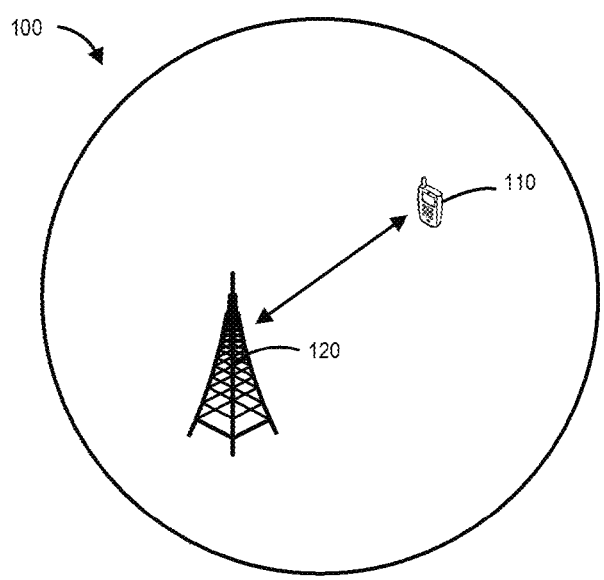
FIG. 1 illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
a combination of analog and/or digital hardware circuit(s) with software/firmware and any portions of hardware processor(s) with software (including digital signal processor(s)), software, and memory(ies) that work together to cause an apparatus, such as a mobile phone or server, to perform various functions) and hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a new radio (NR) NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

The term "transceiver" may refer to any device that may be coupled to one or more antennas or antenna ports to wirelessly transmit and/or receive communication signals. The antennas or antenna ports may be the same or different types. The antennas or antenna ports may be located in different positions of an apparatus. One or more transceivers allow the apparatus to communicate with other devices that may be wired and/or wireless. The one or more transceivers may include processors, controllers, radios, sockets, plugs, buffers, or the like circuits to form one or more communication channels to one or more radio frequency units. The one or more transceivers may be integrated in an apparatus or a system, for example a cellular communication apparatus or system, a WLAN system, or a short ranging system for example Bluetooth system.

As used herein, the term "beam" may refer to a communication resource. Different beams may be considered as different resources. A beam may also be represented as a spatial filter. A technology for forming a beam may be a beamforming technology or another technology. The beamforming technology may be specifically a digital beamforming technology, analog beamforming technology, or a hybrid digital/analog beamforming technology. A communication device (including the terminal device and the network device) may communicate with another communication device through one or more beams. One beam may include one or more antenna ports and be configured for a data channel, a control channel, or the like. One or more antenna ports forming one beam may also be considered as an antenna port set. A beam may be configured with a set of resource, or a set of resource for measurement, and a beam may be represented by for example a reference signal and/or related resource for the reference signal. A beam may also represent by a reference cell identifier or resource identifier.

As used herein, the term "beamforming" may be referred to as spatial filtering, directional transmission, or directional reception. Beamforming is a signal processing technique that may be used at a transmitting device and/or a receiving device to shape or steer an antenna beam along a spatial path between the transmitting device and the receiving device.

Beamforming may rely on antenna elements of an antenna array for signals propagating at specific orientations.

In current channel state information (CSI) framework, CSI reference signals (CSI-RSs) are UE-specifically configured in radio resource control (RRC). However, CSI-RS reference signals may be shared among many terminal devices, i.e., more than one terminal device may be configured to receive the same resource elements (RE). If all the terminal devices within a cell share the same CSI-RS resources, the reference signals may be referred as cell specific CSI-RS. If only a group of terminal devices within the cell share the same CSI-RS resources, such arrangement may be referred as group-specific CSI-RS. And if each terminal device has its own CSI-RS resource, it may be referred as UE-specific CSI-RS. Note that this arrangement is only known to the gNB, the terminal device is not aware if the CSI-RS resource(s) is/are shared with another terminal device or not.

In general, in order to save on downlink (DL) resources, the gNB would try to use cell-specific or group-specific CSI-RS resources. The worst case of DL overhead is with UE-specific CSI-RS where the DL overhead increases linearly with the number of UE in the cell.

CSI-RS has many functions in NR, and example functions may include:
  CSI-RS for DL CSI acquisition
  CSI-RS for beam management (BM) (based on L1-RSRP)
  CSI-RS for tracking (TRS)
  UL CSI acquisition in reciprocity-based UL precoding In some applications (e.g., CSI-RS for BM), CSI-RS may be spatially beamformed into different directions. In general, a terminal device may be configured with up to 48 report configurations per component carrier (CC) and 4 report configurations per bandwidth part (BWP). One CSI resource configuration within 1 report configuration may be configured with up to 16 resource sets (aperiodic CSI) and 1 resource set (otherwise). In each CSI resource set, there are up to 64 non-zero-power (NZP) CSI-RS resources and in each NZP-CSI-RS resource, there are up to 32 antenna ports.

For CSI acquisition, the terminal device may be configured also with a codebook type. Given the measured channel across a CSI-RS resource, the terminal device may choose a favorite codeword from the specified codebook, i.e., precoding matrix indicator (PMI), along with channel quality indicator (CQI), rank indicator (RI). The terminal device may also be configured to measure several CSI-RS resources (up to 8) within a resource set and report the favorite resource, CSI-RS resource indicator (CRI), along with PMI, CQI and rank indication (RI) which corresponds to that selected resource.

As new radio (NR), also known as 5G, is becoming pervasive across industries and geographical areas, handling more advanced services and applications requiring very high data rates, networks are being denser, use more antennas, larger bandwidths and more frequency bands, which means an increased energy consumption, which means an increasing energy consumption.

Currently, energy consumption has become a key part of the operators' operating expense (OPEX). Most of the energy consumption comes from the radio access network and in particular from the Active Antenna Unit (AAU), and data centers and fiber transport also account for a smaller share of the energy consumption. The power consumption of a radio access may be split into two parts: the dynamic part and the static part. The dynamic part is the energy part to power only consumed when data transmission/reception is ongoing. The static part is the energy part consumed all the time to maintain the necessary operation of the radio access devices, even when the data transmission/reception is not on-going.

It is noted in the approved third generation partnership project (3GPP) release 18 (Rel-18) work item description (WID) that spatial adaptation will be specified in Rel-18 New Radio (NR). Approved Rel-18 WID is partially copied as follows:

---
Specify the following techniques in spatial and power domains
Specify necessary enhancements on CSI and beam management related procedures including measurement and
report, and signaling to enable efficient adaptation of spatial elements (e.g. antenna ports, active transceiver chains) [RAN1, RAN2]

---

In the present disclosure, it is focused on enhancement on CSI measurement and reporting to enable an efficient spatial adaption, especially dynamic spatial adaption.

Therefore, according to embodiments of the present disclosure, there is provided a solution related to CSI configuration, measurement, and/or reporting to enable efficient spatial adaptation procedure. With this solution, a terminal device obtains a spatial pattern configuration of reference signal transmission from a network device. The spatial pattern configuration is indicative of whether a plurality of spatial patterns have different energy levels. The terminal device transmits a measurement report to a network device, wherein the measurement report comprises one or more spatial patterns measured by the terminal device based on the spatial pattern configuration.

In embodiments of the present disclosure, with the spatial pattern configuration, the CSI-RS measurement and reporting may be performed on optimized spatial patterns with improved energy efficiency, which may provide a CSI reporting framework to enable an efficient spatial adaptation procedure.

Hereinafter, principle and embodiments of the present disclosure will be described in detail below with reference to the accompanying drawings. Reference is first made to FIG. 1, which illustrates an example environment 100 in which example embodiments of the present disclosure can be implemented.

The environment 100, which may be a part of a communication network, comprises a terminal device 110 and a network device 120 communicating with each other or with other devices via each other. The communication environment 100 may comprise any suitable number of devices and cells. In the communication environment 100, the terminal device 110 and the network device 120 can communicate data and control information with each other. A link from the network device 120 to the terminal device 110 is referred to as a downlink (DL), while a link from the terminal device 110 to the network device 120 is referred to as an uplink (UL).

It is to be understood that two devices are shown in the environment 100 only for the purpose of illustration, without suggesting any limitation to the scope of the present disclosure. In some example embodiments, the environment 100 may comprise a further device to communicate with the terminal device 110 and network device 120.

The communications in the environment 100 may follow any suitable communication standards or protocols, which are already in existence or to be developed in the future, such as universal mobile telecommunications System (UMTS), long term evolution (LTE), LTE-Advanced (LTE-A), the fifth generation (5G) new radio (NR), wireless fidelity (Wi-Fi) and worldwide interoperability for microwave access (WiMAX) standards, and employs any suitable communication technologies, including, for example, multiple-input multiple-output (MIMO), orthogonal frequency division multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), carrier aggregation (CA), dual connectivity (DC), and new radio unlicensed (NR-U) technologies.

The network device 120 transmits to the terminal device 110, a spatial pattern configuration of reference signal transmission from the network device. The spatial pattern configuration is indicative of whether a plurality of spatial patterns have different energy levels. The terminal device 110 obtains a spatial pattern configuration of reference signal transmission, for example, from the network device 120. The terminal device 110 may then transmit a measurement report to the network device 120, wherein the measurement report comprises one or more spatial patterns measured by the terminal device 100 based on the obtained spatial pattern configuration. The network device 120 receives, from the terminal device 110, a measurement report and may further use the report for CSI-RS for DL CSI acquisition, beam management, TRS, or UL CSI acquisition in reciprocity-based UL precoding.

As used herein, the term "spatial pattern" may refer to a plurality of patterns of spatial element or antenna element of reference signal transmission. Different patterns may or may not have different numbers of antenna elements or different antenna elements for transmission. In embodiments of the present disclosure, a spatial pattern may correspond to one or more of: a reference signal resource; a set of reference signal resources; an identifier of a reference signal resource; a number or set of active/unmuted antenna elements or spatial elements; or an arrangement of a set of antenna elements or spatial elements; a number or a set of antenna ports; an energy/power consumption level; an energy saving level; a priority of reference signal for measurement; a codebook configuration; or a spatial configuration; or a report configuration.

In some embodiments, the "spatial pattern" may be reference signal resources, identifier of a reference signal resource, indicative of a number or set of active/unmuted antenna elements or spatial elements, indicative of a number or set of inactive/muted antenna elements or spatial elements, or an antenna port. A spatial pattern may have a same energy consumption or saving level with other spatial patterns or have different energy consumption or saving levels from the other spatial patterns and thus A spatial pattern may correspond to or indicate energy consumption or saving level.

For illustrative purposes, reference will be made to FIGS. 2A and 2B to describe example spatial patterns in embodiments of the present disclosure.

Figure 2A:
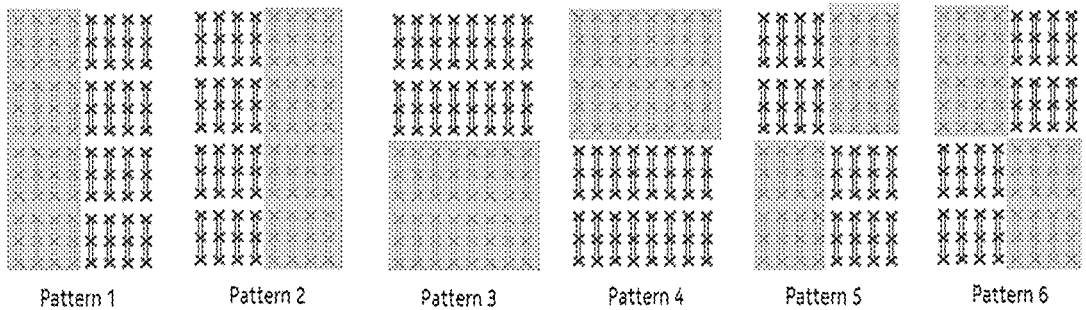
FIG. 2A illustrates example spatial patterns with a same number of active/unmuted antenna/spatial elements.

FIG. 2A illustrates examples of spatial patterns with the same number of active/unmuted antenna or spatial elements. In FIG. 2A, spatial patterns 1 to 6 are candidate patterns at the network device 120 and have the same number of active/unmuted antenna or spatial elements. As shown, the elements in the grey boxes are muted or inactive. Each of the patterns 1-6 has a same number of active/unmuted antenna or spatial elements and a same number of inactive/muted antenna or spatial elements, as an example. Considering each of the spatial elements consumes a similar amount of power or energy, there is no substantial difference in power/energy saving level or consumption level among the spatial patterns 1 to 6. For illustrative purposes, this case may be referred as Case 1.

Power/energy saving level or consumption level in the present disclosure may indicate relative power/energy saving or consumption difference amongst different patterns. Power/energy saving level or consumption level may indicate priority or priority order amongst different patterns.

Figure 2B:
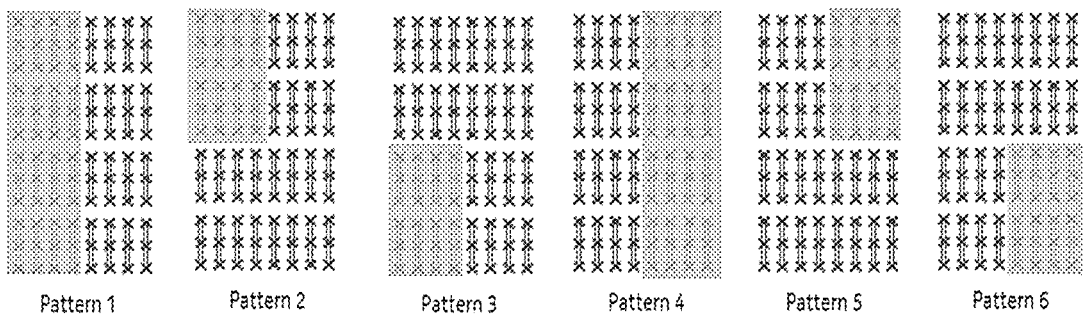
FIG. 2B illustrates example spatial patterns with different numbers of active/unmuted antenna/spatial elements.

FIG. 2B illustrates examples of spatial patterns with different numbers of active/unmuted antenna or spatial elements. In FIG. 2B, spatial patterns 1 to 6 are six candidate patterns at the network device 120. As shown, the elements in the grey boxes are muted or inactive. The spatial patterns 1-6 have different numbers of active/unmuted antenna or spatial elements. The patterns 1 and 4 have a same number of active/unmuted antenna or spatial elements and a same number of inactive/muted antenna or spatial elements as an example, while patterns 2, 3, 5, and 6 have more active/unmuted antenna or spatial elements and less inactive/muted antenna or spatial elements than patterns 1 and 4, as an example. Therefore, patterns 2, 3, 5, and 6 consume higher energy levels than the patterns 1 and 4.

Therefore, in FIG. 2B, different patterns may have different power/energy saving levels or consumption levels and this case may be referred as Case 2 only for illustrative purposes. When the network device 120 uses pattern 1 or 4 to transmit reference signals (or data), it consumes less energy than any of other patterns 2, 3, 5, and 6 in FIG. 2B. Thus, this means that the reference signal transmission with some spatial patterns may consume less energy than others. Therefore, in some scenarios, it may be desirable that the terminal device 110 may provide measurement reports with spatial patterns with less active/unmuted antenna, the reported spatial patterns may also need to meet one or more criteria related to performance constraints.

Figure 3:
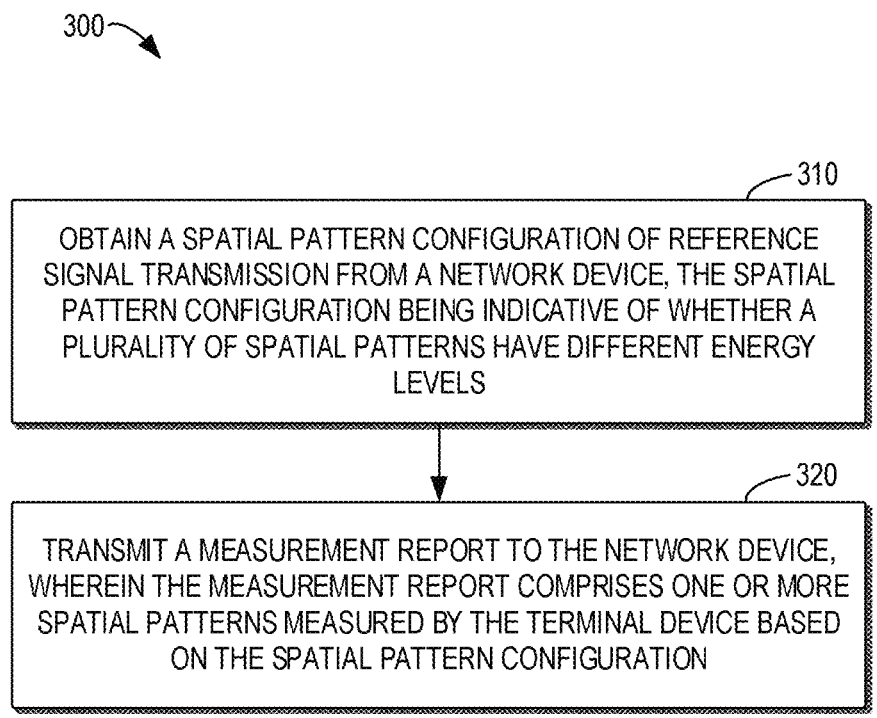
FIG. 3 illustrates an example flowchart of a method implemented at a terminal device according to example embodiments of the present disclosure.

FIG. 3 illustrates an example flowchart of a method 300 implemented at a terminal device according to example embodiments of the present disclosure. For the purpose of discussion, the method 200 will be described from the perspective of the terminal device 110 with reference to FIGS. 1, 2A and 2B.

As shown in FIG. 3, at block 310, the terminal device 110 obtains a spatial pattern configuration of reference signal transmission from a network device 120. The spatial pattern configuration is indicative of whether a plurality of spatial patterns have different energy levels.

As mentioned above, in embodiments of the present disclosure, a spatial pattern may correspond to, mean or indicate or be indicated different parameters or configurations. In some example embodiments, each of the spatial patterns may correspond to a reference signal resource or a set of reference signal resources. Additionally or alternatively, each of the spatial patterns may correspond to an identifier of a reference signal resource. Additionally or alternatively, each of the spatial patterns may correspond to a number or set of active/unmuted antenna elements or spatial elements. Additionally or alternatively, each of the spatial patterns may correspond to an arrangement of a set of antenna elements or spatial elements. Additionally or alternatively, each of the spatial patterns may correspond to a number or set of antenna ports, a codebook configuration, a spatial configuration, or a report configuration. Additionally or alternatively, each of the spatial patterns may correspond to an energy/power consumption level, or an energy saving level. Additionally or alternatively, each of the spatial patterns may correspond to a priority of reference signal for measurement.

Additionally or alternatively, each of the spatial patterns may be a reference signal resource or resource set, an identifier of a reference signal resource or resource set, or an antenna ports or set of antenna ports which indicates or is associated with a particular power/energy saving level or consumption level.

The spatial patterns may be configured or indicated, via system information (SI), radio resource control (RRC), media access control (MAC)—control element (CE), or downlink control information (DCI). The configuration of the spatial patterns may indicate or contain information indicative of whether a plurality of spatial patterns have different energy levels.

For example, if one or more spatial patterns are represented by a CSI-RS resource or a CSI-RS resource set, one or more of such information may be configured on a per CSI-RS resource level or a CSI-RS resource set level.

In some embodiments, the difference of energy levels may mean, indicate or include or be indicated by different information or a combination of information. In some example embodiments, the different energy levels for the plurality of spatial patterns may comprise different numbers of active/unmuted antenna elements or spatial elements. Additionally or alternatively, the different energy levels for the plurality of spatial patterns may comprise different numbers of inactive/muted antenna elements or spatial elements. Additionally or alternatively, the different energy levels for the plurality of spatial patterns may indicate or comprise different energy consumption levels or different energy saving levels. Additionally or alternatively, the different energy levels for the plurality of spatial patterns may indicate or comprise different priorities of the reference signal(s) for measurement.

With this information, the terminal device may at least determine whether e.g. the configured spatial patterns have the same or different energy levels (for example, the same number or different numbers of unmuted/active (or muted/inactive) antenna/spatial elements, energy consumption levels, energy saving levels, priorities of the reference signal for measurement, etc.).

In some embodiments, two or more of the plurality of spatial patterns may be determined as having a same energy level or have no energy level difference based on one or more of:

they correspond to same CSI-RS resource(s) or set of CSI-RS resources they correspond to a same CSI reporting configuration or setting;

they correspond to different CSI-RS resources or different sets of CSI-RS but with a same number of ports;

they correspond to same N1 and N2 parameters representing numbers of active/unmuted antenna elements along horizontal and vertical directions respectively;

they correspond to a same codebook or spatial or report configuration;

they correspond to same codebook subset restriction (CBSR);

they are associated directly or indirectly with a variable indicating that they have a same number of active/unmuted (or inactive/muted) antenna elements or spatial elements; or an indicator in the spatial pattern configuration indicates the plurality of spatial patterns have a same energy level.

In other word, the above configuration or parameters may imply there is no energy level difference.

In some embodiments, one CSI-RS resource may be used for different patterns, and thus a CSI-RS resource may be associated to multiple subsets of antenna ports. In such a case, there would be a need for one or more indications representing or indicating one or more of a number or set of antenna elements that are active/unmuted/'on' (or muted/'off'), multiple transmission configuration indicator (TCI) states, and/or multiple slot offsets. In addition, a sub-selection of subset of antenna ports, TCI states, and/or number of slot offsets may be implemented via MAC CE or DCI.

In some embodiments, different CSI-RS resources may be used for different patterns and thus different CSI-RS resource are associated with different spatial patterns. In this case, each CSI-RS resource may be associated with an indication representing corresponding number or set of antenna elements that are active/unmuted/'on' (or muted/'off') and/or with multiple slot offsets.

In some example embodiments, the spatial pattern configuration may comprise an indicator indicating whether the plurality of spatial patterns have different energy levels. In this case, the indicator may explicitly inform the terminal device of difference information on the energy levels.

In some example embodiments, the spatial pattern configuration may comprise a set of reference signal configurations, wherein the set of reference signal configurations indicate energy difference information. In other words, if the network device configured a terminal device with a set of different reference signal resources, this set may contain or be associated with an energy difference indicator to indicate whether there is an energy difference.

In some example embodiments, the set of reference signal configurations may comprise at least one subset of reference signal configurations. The subset of reference signal configurations may comprise a list of reference signal configurations, and the subset of reference signal configurations may indicate energy difference information. In other words, the subset of the reference signal configuration includes reference signal configuration corresponding to different energy levels and thus if a terminal device is configured with such a subset of reference signal configurations, it implies there is an energy level difference for the plurality of spatial patterns.

An example information element in spatial pattern configuration is given as below. However, it is to be appreciated that it is given for illustrative purposes, and the present disclosure is not limited thereto; in fact, the CSI-RS configuration, especially the compatible patterns may also be provided separately from the spatial pattern configuration.

Example Information Elements

```
CSI-RS_powerconsumingInfo {
Energy Indicator Boolean{true, false},
firstSet {
//EnergyIndicator may be here for each set of CSI-RS, which relies on only one type of CSI-RS configured or
not
```

```
CSI-RS_id list of IDs { }
}
secondSet {
//EnergyIndicator may be here for each set of CSI-RS, which relies on only one type of CSI-RS configured or
not
Subset1 {
CSI-RS_ID list of IDs;
//for example CSI-RS1, CSI-RS2..., indicate the CSI-RS belongs to a compatible patterns and listed based on
energy saving priority
}
Subset2 {
CSI-RS_ID list of IDs;
//for example CSI-RS1, CSI-RS2..., indicate the CSI-RS belongs to a compatible patterns and listed based on
energy saving priority
}
Subset3 {
CSI-RS_ID list of IDs;
//for example CSI-RS1, CSI-RS2..., indicate the CSI-RS belongs to a compatible patterns and listed based on
energy saving priority
}
...
}
```

The first set and second set illustrated above show two candidate sets, but only one of the sets may be provided in the spatial pattern configuration. In the example information element, each CSI-RS ID may be configured in a similar way to the current standard. If the energy difference indicator "EnergyIndicator" indicates no difference in transmitting energy of the CSI-RS (for example, Case 1 in FIG. 2A), CSI-RS list all IDs of reference signals and the terminal device 110 will detect the best reference signal(s). Alternatively, the terminal device may also determine that there is no energy level difference if the first set is configured, without using the energy difference indicator.

For the second set, the compatibility of the CSI-RS will be provided to the UE, meaning that the CSI-RS in a same subset could be subset of another one in the subset or supper set of another one. Besides, the detailed energy difference information, for example, which one is the best energy saving, may be determined based on the list/priority indicated in the subset. For different subsets, they may not be compatible. If no subset is configured, the format would be as the first set, and the terminal device performs measurements on reference signals based on the list/priority of the IDs.

Please be noted that although the second set may include "EnergyIndicator" to indicate there is energy level difference in transmitting energy of the CSI-RS, the terminal device may also learn that there is an energy level difference if the second set with one or more subsets is configured, without using the energy difference indicator. If a subset or a CSI-RS belongs to a subset is configured or indicated for measurement, the terminal device may not measure CSI-RS of another subset because the CSI-RS in different subsets are not compatible. It should be noted that CSI-RS is used as an example in the present disclosure and other reference signal is also possible.

In some embodiments, the energy difference information may mean, indicate or be indicated by one or more of the following:
  a list of spatial patterns with an increasing priority order according to energy consumption levels;
  a list of spatial patterns with a decreasing priority order according to energy consumption levels;
  a list of spatial patterns with an increasing priority order according to numbers of active antenna or spatial elements;
  a list of spatial patterns with an increasing priority order according to numbers of inactive antenna or spatial elements;
  power or energy saving levels corresponding to respective spatial patterns;
  power or energy consumption levels corresponding to respective spatial patterns;
  priorities of the spatial patterns;
  respective numbers or information indicative of respective numbers of active/unmuted antenna elements or spatial elements in the spatial patterns;
  respective numbers or information indicative of respective numbers of inactive/muted antenna or spatial elements in the spatial patterns; or
  priorities for measurement of the spatial patterns.

Reference is made back to FIG. 2, at block 320, the terminal device 110 transmits a measurement report to the network device. The measurement report comprises one or more spatial patterns measured by the terminal device based on the spatial pattern configuration.

In some embodiments, the terminal device 110 may for example measure the reference signal and transmit the measurement report to the network device periodically, or triggered by some predetermined conditions.

In some embodiments, after obtaining the spatial pattern configuration, the terminal device 110 may also receive a report request from the network device 120. The report request may indicate a set of spatial patterns amongst the plurality of spatial patterns to be measured by the terminal device. The set of spatial patterns may include a portion or all of the plurality of spatial patterns in the spatial pattern configuration. In such a case, the terminal device 110 may determine to measure and report a part of the set of spatial patter indicated in the report request based on the spatial pattern configuration. The terminal device may measure reference signals such as CSI-RSs and transmit the measurement report upon of reception of the report request.

In some embodiments, each of the antenna/spatial patterns (or specifically transceiver-unit patterns) may correspond to for example, a set or subset of antenna elements being on or off. For a CSI report configuration corresponding to or associated with the set of antenna patterns, the terminal device 110 may transmit measurement report based on whether the spatial patterns have any energy level difference, for example, whether they have the same number of active/unmuted (or inactive/muted) antenna or spatial elements or not. In other words, it is based on whether the spatial patterns belong to either Case 1 or Case 2 illustrated in FIG. 2A and FIG. 2B. Specifically, one or more of the following operations could be adopted as a behavior of the terminal device 110.

In some embodiments, the spatial pattern configuration may be indicative of the set of spatial patterns have a same energy level, for example, they may have same number of active/unmuted antenna elements or spatial elements; in other words, it is Case 1 as in FIG. 2A. In such a case, the terminal device 110 may report at least one best pattern among the set of patterns. Additionally or alternatively, the terminal device 110 may report at least one preferred pattern among the set of patterns. Additionally or alternatively, the terminal device 110 may report at least one suitable pattern fulfilling one or more performance criteria. In particular, the terminal device 110 may select the best/preferred/suitable pattern, e.g., based on the terminal implementation or other.

Examples of terminal implementation may be based on reporting patterns, for example, better reference signal receiving power (RSRP) of CSI-RS ports, and/or better CQI/rank derived from the corresponding spatial patterns.

Other than the solution based on the terminal implementation, the network device 120 may configure additional criteria such as ones related to rank, RSRP or CQI etc. Additionally or alternatively, the network device 120 may configure the terminal device 110 to report more than one pattern, e.g., 2 out of 4 patterns, and one of the patterns will be selected by the network device 120, e.g., according to measurement reports from multiple terminal devices.

In some embodiments, the spatial pattern configuration is indicative of the plurality of spatial patterns have different energy levels, for example they may have different numbers of active/unmuted antenna elements or spatial elements, in other words, it is Case 2 as shown in FIG. 2B. The measurement report may comprise the one or more spatial patterns with a lowest energy level. The one or more spatial patterns may fulfil one or more performance criteria. Thus, the terminal device 110 may report a pattern(s) with best power/energy saving while fulfilling one or more criteria related with performance constraint.

Similarly, the terminal device 110 may report one or more patterns based on one or more certain criteria such as those related to rank (such as minimum rank), CQI (such as minimum CQI), precoding matrix index (PMI), RSRP, signal to interference plus noise ratio (SINR), etc. In addition, the terminal device 110 may also be configured/asked to report related measures (such as rank, CQI, PMI, etc.) for the one or more patterns in the measurement report.

For example, the terminal device 110 may be configured with one or more criteria related to rank, CQI, PMI, RSPR, SINR for the selection of the 'best' pattern. Alternatively, the terminal device 110 may be indicated, e.g., via DCI or MAC CE, the one or more criteria.

For selection of patterns to measure corresponding reference signals, the terminal device 110 may obtain compatible information on at least one compatible set of spatial patterns among the plurality of spatial patterns. And the measurement and reporting of CSI-RS may be determined based on the compatible information. The at least one compatible set may comprise spatial patterns which have at least some overlapping active/unmuted antenna elements or spatial elements but have different energy levels. The one or more spatial patterns reported in the measurement report may be determined based on the at least one set of compatible spatial patterns.

In some embodiments, the compatible information on at least one compatible set of spatial patterns may be obtained from the network device 120. In some embodiments, the terminal device 110 may obtain the compatible information based on the spatial pattern configuration. For example, from an RRC signaling as described hereinabove with reference to compatible patterns in an example information element in spatial pattern configuration e.g. the subset of CSI-RSs as described above. Additionally or alternatively, such information could be obtained from the other signaling from the network device 120, for example, the report request or another separate signal indicating the compatible set of spatial patterns.

In some embodiments, the terminal device may be configured to obtain the at least one compatible set of spatial patterns or determine the spatial patterns to be reported by a search approach. The search approach may include first selecting, from the plurality of spatial pattern, at least one spatial pattern and then obtaining, from other spatial patterns, compatible spatial patterns with the selected at least one spatial pattern for the at least one compatible set of spatial patterns, wherein the compatible spatial patterns have at least some overlapping active/unmuted (or inactive/muted) antenna elements or spatial elements with the selected at least one spatial pattern.

In some embodiments, the terminal device 110 may select the at least one spatial pattern that has a highest energy saving level, a lowest energy consumptions level, a highest report priority, or a smallest number of active/unmuted antenna elements or spatial elements. Alternatively, the terminal device 110 may select the at least one spatial pattern that has a lowest energy saving level, a highest energy consumptions level, a lowest report priority, or a largest number of active/unmuted antenna elements or spatial elements.

For example, for any of the above cases, the terminal device 110 may be configured/specified/indicated to follow a search approach to select spatial patterns. The terminal device 110 may be specified or configured or indicated (e.g., as part of the CSI report configuration, triggering state, and/or explicitly via DCI or MAC CE) to apply the search approach.

In some embodiments, the selected at least one spatial pattern may fulfil one or more performance criteria such as ones related to CQI, PMI, RSPR, SINR, etc.

In some embodiments, the above operations may be repeated for other patterns in the obtained compatible spatial patterns. For example, the terminal device may select from the compatible spatial patterns, at least one further spatial pattern; and obtain further compatible patterns associated with the selected at least one further spatial patterns, which is compatible with the at least one further spatial pattern.

In other words, the further compatible spatial patterns may have at least some overlapping active/unmuted antenna elements or spatial elements with the selected at least one further spatial pattern or in a same subset of reference signal configurations.

For illustrative purposes different examples the search approach will be described.

According to an example search approach, the terminal device 110 may (1a) start with the patterns with highest number of active/unmuted antenna/spatial elements, or equivalently with the lowest number of antenna/spatial elements that are muted or turned off, that satisfy one or more of the above-mentioned performance criteria and selects at least one of these patterns;

(2a) discard from evaluation/measurement/report patterns that are not partially or fully subsets of the selected at least one pattern (i.e., the active/unmuted antenna/spatial elements of these patterns are not partially or fully subsets of the selected at least one pattern).

Herein, the partially or fully subsets may mean two or more spatial patterns have at least some overlapping active/unmuted antenna elements or spatial elements. This search approach may be repeated on the outcome of (2a), i.e., for other remaining spatial patterns.

According to another example search approach, the terminal device 110 may (1b) start with the patterns with highest number of active/unmuted antenna/spatial elements and selects at least one of these patterns, and (2b) discard from evaluation/measurement/report patterns that are not partially or fully subsets of the selected at least one pattern. This approach may be repeated on the outcome of (2b). In this case, it does not consider whether the starting patterns in (1b) satisfy one or more of the above-mentioned performance criteria or not. This search approach may also be repeated on the outcome of (2b).

In a further example search approach, the terminal device 110 may (a) (1c) start with patterns with lowest number of antenna/spatial elements, or equivalently with highest number of antenna/spatial elements that are muted or turned off, and select at least one of these pattern; and (b) (2c) discard from evaluation/measurement/report patterns that are not partially or fully supersets of the selected at least one pattern. This search approach may be repeated on the outcome of (2c).

In a still further example search approach, Alternatively, the terminal device 110 may (1d) start with patterns with lowest number of active/unmuted antenna/spatial elements that satisfy one or more of the above-mentioned performance criteria and selects at least one of these patterns;

(2d) discard from evaluation/measurement/report patterns that are not partially or fully supersets of the selected at least one pattern. In this case, it further considers whether the starting patterns in (1d) satisfy one or more of the above-mentioned performance criteria or not. This search approach may also be repeated on the outcome of (2d).

In such a way, the terminal device may obtain the sets of compatible spatial patterns.

In some embodiments, the terminal device 110 may use the above search approach to select a set of patterns with same number of active/unmuted, or inactive/muted, antenna/spatial elements based on one or more of the above-mentioned criteria. The terminal device 110 may then select one or more patterns to report from this set.

Thus, the terminal device 110 may then follow the above procedure, e.g., based on configured one or more criteria (related to performance and/or energy/power saving), in order to determine one or more patterns to report.

In some embodiments, the terminal device 110 may transmit a measurement report on the selected at least one spatial pattern, for example, outcome of (1) of the search approach before evaluating other pattern, to the network device 120. This allows the network device 120 to reduce the number of CSI-RS resources for CSI-RS transmission. This may require configuring/indicating, for aperiodic or semi-persistent report (or even periodic report), an additional Physical Uplink Control Channel (PUCCH) or Physical Uplink Shared Channel (PUSCH) resources using which the outcome of (1) is reported.

Thus, the network device 120 may determine a spatial pattern having at least some overlapping active/unmuted antenna elements or spatial elements with the selected at least one spatial pattern or in a same subset of reference signal configurations, and transmit reference signals on a reference signal resource or resource set corresponding to the determined spatial pattern.

Accordingly, the terminal device 110 may receive the reference signals on the reference signal resource or resource set corresponding to the spatial pattern. In this case, the network device 120 does not need to send CSI-RS resources corresponding to incompatible patterns. This clearly decreases the overhead in the communication system.

In some embodiments, for aperiodic CSI reporting, a triggering state may point to a CSI-RS resource set type, which is corresponding to 'sounding' spatial patterns.

Figure 4:
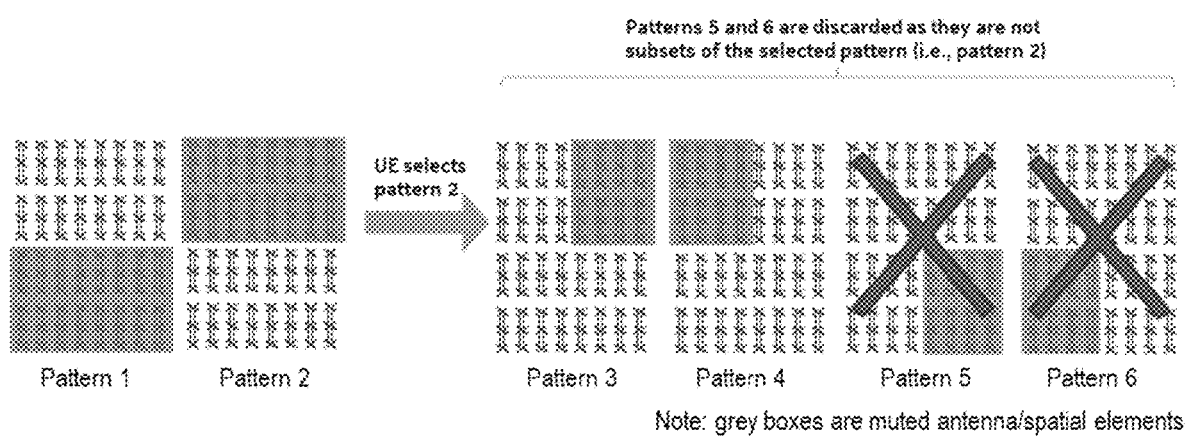
FIG. 4 illustrates an example search approach for spatial patterns according to some embodiments of the present disclosure.

FIG. 4 illustrates an example search approach for spatial patterns according to some embodiments of the present disclosure. The example search approach is applicable to a spatial pattern configuration where the spatial patterns have different numbers of active antenna or spatial elements.

In this example, Pattern 1 and Pattern 2 are the patterns that have highest number of active antenna/spatial elements, or have the highest energy level. The terminal device 110 may select Pattern 1, e.g., based on implementation. Then, the terminal device 110 discards Patterns 5 and 6 from the search because they are not subsets of the selected Pattern 1 (given that the active antenna/spatial elements of Pattern 5 and Pattern 6 are not subsets of the active elements of Pattern 1). In other words, they are incompatible with Patten 1. Hence, the terminal device 110 would either selects/reports Pattern 3 or Pattern 4 e.g., depending on if at least one of these patterns satisfies some performance constraint(s); otherwise, the terminal device 110 would report Pattern 1.

It is worth noting that the terminal device 110 may be configured to report that it has first selected Pattern 1 before transmitting CSI-RS resources to 'evaluate' remaining patterns. In this case, the network device 120 does not need to send CSI-RS resources corresponding to Pattern 5 and 6. This decreases the overhead in the communication system. In addition, the terminal device 110 may be configured or indicated to report the best/preferred/suitable pattern for different set of patterns with different number of active/unmuted antenna or spatial elements.

With embodiments of the present disclosure, the terminal device may at least determine whether e.g. the configured spatial patterns have the same number or different numbers of unmuted/active (or muted/inactive) antenna/spatial elements, or whether they have the same or different energy levels (for example, energy consumption levels, energy saving levels, different priorities of the reference signal for measurement, etc.). In some embodiments of the present disclosure, due to the knowledge of the set compatible spatial pattern, the terminal does not require to measure or report all the spatial patterns, thereby decreasing the burden at the terminal side, and allowing to decrease the overhead (in terms of 'sounded' spatial muting patterns) in the communication system.

Figure 5:
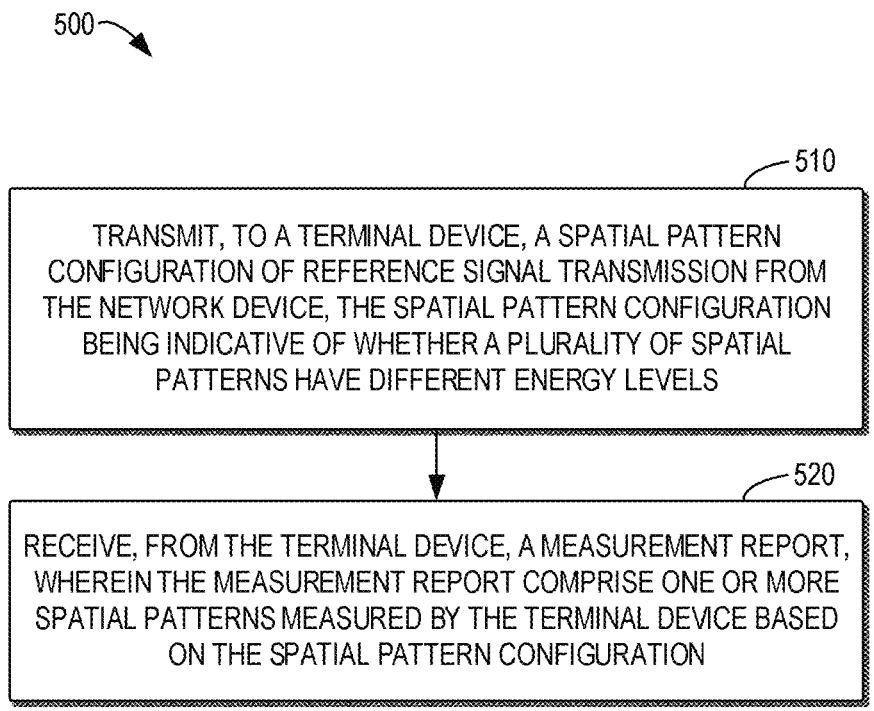
FIG. 5 illustrates an example flowchart of a method implemented at a network device according to example embodiments of the present disclosure.

FIG. 5 illustrates an example flowchart of a method 500 implemented at a network device according to example embodiments of the present disclosure. For the purpose of discussion, the method 500 will be described from the perspective of the network device 120 with reference to FIGS. 1, 2A and 2B.

As shown in FIG. 5, at block 510, the network device 120 may transmit, to a terminal device, a spatial pattern configuration of reference signal transmission from the network device. The spatial pattern configuration may be indicative of whether a plurality of spatial patterns have different energy levels.

At block 520, the network device 120 may receive, from the terminal device, a measurement report. The measurement report may comprise one or more spatial patterns measured by the terminal device based on the spatial pattern configuration.

In some example embodiments, each of the spatial patterns may correspond to a reference signal resource or a set of reference signal resources. Additionally or alternatively, each of the spatial patterns may correspond to an identifier of a reference signal resource. Additionally or alternatively, each of the spatial patterns may correspond to a number or set of antenna elements or spatial elements, an arrangement of a set of antenna elements or spatial elements, an energy/power consumption level, an energy saving level, a priority of reference signal for measurement, a number or set of antenna ports; a codebook configuration; a spatial configuration; or a report configuration.

In some example embodiments, the different energy level for the plurality of spatial patterns may comprise at least one of: different numbers of active/unmuted antenna elements or spatial elements; different numbers of inactive/muted antenna elements or spatial elements; different energy consumption levels; different energy saving levels; or different priority of the reference signal for measurement.

In some example embodiments, the spatial pattern configuration may comprise an indicator indicating whether the plurality of spatial patterns have different energy levels.

In some example embodiments, the spatial pattern configuration may comprise a set of reference signal configurations. The set of reference signal configurations may indicate energy difference information.

In some example embodiments, the set of reference signal configurations may comprise at least one subset of reference signal configurations. The at least one subset of reference signal configurations may comprise a list of reference signal configuration. The subset of reference signal configurations may indicate energy difference information.

In some example embodiments, the energy difference information may indicate one or more of the following:
 a list of spatial patterns with an increasing priority order according to energy consumption levels;
 a list of spatial patterns with an decreasing priority order according to energy consumption levels;
 a list of spatial patterns with an increasing priority order according to numbers of active antenna or spatial elements;
 a list of spatial patterns with an increasing priority order according to numbers of inactive antenna or spatial elements;
 power or energy saving levels corresponding to respective spatial patterns;
 power or energy consumption levels corresponding to respective spatial patterns;
 priorities of the spatial patterns;
 respective numbers or information indicative of respective numbers of active/unmuted antenna elements or spatial elements in the spatial patterns;
 respective numbers or information indicative of respective numbers of inactive/muted antenna or spatial elements in the spatial patterns; or
 priorities for measurement of the spatial patterns.

In some example embodiments, the network device 120 may transmit a report request to the terminal device. The report request may indicate a set of spatial patterns amongst the plurality of spatial patterns to be measured by the terminal device.

In some example embodiments, the spatial pattern configuration may be indicative of the plurality of spatial patterns have a same energy level. The network device 120 may receive the measurement report comprising one or more of at least one best pattern among the plurality of patterns; at least one preferred pattern among the plurality of patterns; or at least one pattern fulfilling one or more performance criteria.

In some example embodiments, the spatial pattern configuration may be indicative of the plurality of spatial patterns have different energy levels. The measurement report may comprise the one or more spatial patterns with a lowest energy level.

In some example embodiments, the network device 120 may transmit compatible information on at least one compatible set of spatial patterns among the plurality of spatial patterns. The at least one compatible set may indicate or comprise spatial patterns which have at least some overlapping active/unmuted antenna elements or spatial elements but have different energy level. The one or more spatial patterns reported in the measurement report may be determined based on the at least one set of compatible spatial patterns.

In some example embodiments, the network device 120 may receive another measurement report on at least one spatial pattern from the terminal device. The network device may transmit reference signals on a reference signal resource or resource set corresponding to a spatial pattern having at least some overlapping active/unmuted antenna elements or spatial elements with the at least one spatial pattern or in a same subset of reference signal configurations.

Figure 6:
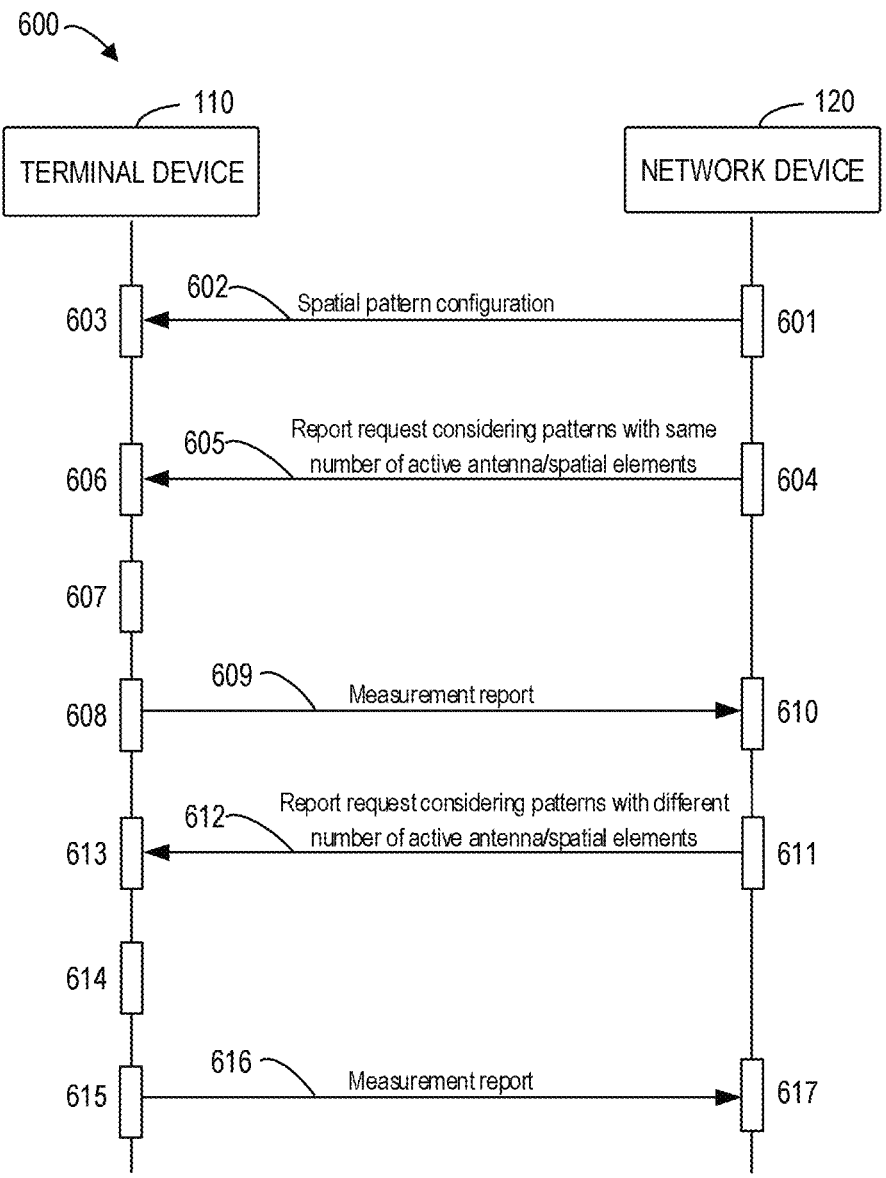
FIG. 6 illustrates an example signaling process for reporting measurements on reference signals according to some embodiments of the present disclosure.

FIG. 6 illustrates an example signaling process for reporting measurements on reference signals according to some embodiments of the present disclosure. For the purpose of discussion, the process 600 will be described with reference to FIGS. 1 to 5. The process 600 may involve the terminal device 110 and network devices 120 as illustrated in FIG. 1. It would be appreciated that although the process 600 has been described in the communication environment 100 of FIG. 1, this process may be likewise applied to other communication scenarios with similar issues.

In the process 600, at 601, the network device 120 transmits a spatial pattern configuration 602 of reference signal transmission to the terminal device 110. At 603, the terminal device 110 obtains the spatial pattern configuration 602 from the network device 120. The spatial pattern configuration may be indicative of whether a plurality of spatial patterns have different energy levels.

At 604, the network device 120 may transmit a report request 605 to the terminal device 110. At 606, the terminal device 110 may receive the report request 605 from the network device 120. The report request 605 may indicate a set of spatial patterns amongst the plurality of spatial patterns to be measured by the terminal device. The report request 605 may be for example indicative of the plurality of spatial patterns without energy level difference, which corresponds to Case 1 as shown in FIG. 2A.

In such a case, at 607, the terminal device 110 may determine that the spatial patterns to be measured have a same energy level, e.g. the same number of active/unmuted antenna elements or spatial elements. The terminal device 110 may further select spatial patterns based on the terminal implementation. The terminal device 110 then may perform CSI-RS measurement on the selected spatial patterns.

At 608, the terminal device 110 transmits a measurement report 609 to the network device 120. At 610, the network device 120 receives the measurement report 609. The measurement report 609 may comprise one or more spatial patterns measured by the terminal device based on the spatial pattern configuration. For example, the measurement report 609 may comprise one or more of at least one best pattern among the plurality of patterns, at least one preferred pattern among the plurality of patterns, or at least one pattern fulfilling one or more performance criteria.

At 611, the network device 120 may transmit a report request 612 to the terminal device 110. At 613, the terminal device 110 may receive the report request 613 from the network device 120. The report request 613 may indicate a set of spatial patterns amongst the plurality of spatial patterns to be measured by the terminal device 110. The report request 612 may be for example indicative of the plurality of spatial patterns have different energy levels, which corresponds to Case 2 as shown in FIG. 2B.

In such a case, at 614, the terminal device 110 may determine that the spatial patterns to be measured have different energy levels. The terminal device 110 may further select one or more with best power/energy saving while fulfilling one or more criteria related with performance constraints, such as minimum rank. The terminal device 110 then performs CSI-RS measurement on the selected spatial patterns. At 614, the terminal device 110 may apply search approach above to select spatial patterns to measure.

At 615, the terminal device 110 transmits a measurement report 616 to the network device 120. At 617, the network device 120 receives the measurement report 616. The measurement report 616 may comprise one or more spatial patterns measured by the terminal device 110 based on the spatial pattern configuration. For example, the measurement report 616 may comprise one or more spatial patterns with a lowest energy level.

In some embodiments, an apparatus of a terminal device capable of performing the method 300 is provided. The apparatus may comprise means for performing the respective steps of the method 300. The means may be implemented in any suitable form. For example, the means may be implemented in a circuitry or software module.

In some embodiments, the apparatus of the terminal device may comprise means for obtaining a spatial pattern configuration of reference signal transmission from a network device, the spatial pattern configuration being indicative of whether a plurality of spatial patterns have different energy levels; and means for transmitting a measurement report to a network device, wherein the measurement report comprises one or more spatial patterns measured by the terminal device based on the spatial pattern configuration.

In some embodiments, each of the spatial patterns may correspond to one or more of: a reference signal resource; a set of reference signal resources; an identifier of a reference signal resource; a number or set of active/unmuted antenna elements or spatial elements; an arrangement of a set of antenna elements or spatial elements; an energy/power consumption level, an energy saving level, a priority of reference signal for measurement, a number or set of antenna ports; a codebook configuration; a spatial configuration; or a report configuration.

In some embodiments, the different energy levels may comprise at least one of: different numbers of active/unmuted antenna elements or spatial elements; different numbers of inactive/muted antenna elements or spatial elements; different energy consumption levels; different energy saving levels; or different priorities of the reference signal for measurement.

In some embodiments, the spatial pattern configuration may comprise an indicator indicating whether the plurality of spatial patterns have different energy levels.

In some embodiments, the spatial pattern configuration may comprise a set of reference signal configurations, wherein the set of reference signal configurations indicate energy difference information.

In some embodiments, the set of reference signal configurations may comprise at least one subset of reference signal configurations, wherein the at least one subset of reference signal configurations may comprise a list of reference signal configuration, and the subset of reference signal configurations indicate energy difference information.

In some embodiments, the energy difference information may indicate one of: a list of spatial patterns with an increasing priority order according to energy consumption levels; a list of spatial patterns with an decreasing priority order according to energy consumption levels; a list of spatial patterns with an increasing priority order according to numbers of active antenna or spatial elements; a list of spatial patterns with an increasing priority order according to numbers of inactive antenna or spatial elements; power or energy saving levels corresponding to respective spatial patterns; power or energy consumption levels corresponding to respective spatial patterns; priorities of the spatial patterns; respective numbers or information indicative of respective numbers of active/unmuted antenna elements or spatial elements in the spatial patterns; respective numbers or information indicative of respective numbers of inactive/muted antenna or spatial elements in the spatial patterns; or priorities for measurement of the spatial patterns.

In some embodiments, the plurality of spatial patterns may be determined as having a same energy level based on a determination of one or more of: the plurality of spatial patterns corresponding to a same channel status information—reference signal (CSI-RS) resources or set of CSI-RS resources; the plurality of spatial patterns corresponding to a same reporting configuration; the plurality of spatial patterns corresponding to different CSI-RS resources or different sets of CSI-RS but with a same number of ports; the plurality of spatial patterns corresponding to same N1 and N2 parameters representing numbers of active/unmuted antenna elements along horizontal and vertical directions respectively; the plurality of spatial patterns corresponding to a same codebook or spatial or report configuration; the plurality of spatial patterns corresponding to same codebook subset restriction (CBSR); the plurality of spatial patterns being associated directly or indirectly with a variable indicating that they have a same number of active/unmuted antenna elements or spatial elements; or an indicator in the spatial pattern configuration indicates the plurality of spatial patterns have a same energy level.

In some embodiments, the apparatus may comprise means for receiving a report request from the network device, wherein the report request indicates a set of spatial patterns amongst the plurality of spatial patterns to be measured by the terminal device.

In some embodiments, the spatial pattern configuration may be indicative of the plurality of spatial patterns have a same energy level, and the measurement report may comprise one or more of: at least one best pattern among the plurality of patterns; at least one preferred pattern among the plurality of patterns; or at least one pattern fulfilling one or more performance criteria.

In some embodiments, the spatial pattern configuration may be indicative of the plurality of spatial patterns have different energy levels, and the measurement report comprises the one or more spatial patterns with a lowest energy level.

In some embodiments, the apparatus may comprise means for obtaining compatible information on at least one compatible set of spatial patterns among the plurality of spatial patterns, wherein the at least one compatible set comprises spatial patterns which have at least some overlapping active/unmuted antenna elements or spatial elements but have different energy levels, wherein the one or more spatial patterns reported in the measurement report is determined based on the at least one set of compatible spatial patterns.

In some embodiments, the compatible information on at least one compatible set of spatial patterns may be obtained from the network device.

In some embodiments, the compatible information on at least one compatible set of spatial patterns may be obtained by the terminal device based on the spatial pattern configuration.

In some embodiments, the apparatus may comprise means for obtaining the at least one compatible set of spatial patterns. The means for obtaining the at least one compatible set of spatial patterns may comprise means for selecting, from the plurality of spatial pattern, at least one spatial pattern having one of: a highest energy saving level, a lowest energy consumptions level, a highest report priority, a smallest number of active/unmuted antenna elements or spatial elements; a lowest energy saving level, a highest energy consumptions level, a lowest report priority, or a largest number of active/unmuted antenna elements or spatial elements. The apparatus may comprise means for obtaining, from other spatial patterns, compatible spatial patterns with the selected at least one spatial pattern for the at least one compatible set of spatial patterns, wherein the compatible spatial patterns have at least some overlapping active/unmuted antenna elements or spatial elements with the selected at least one spatial pattern.

In some embodiments, the selected at least one spatial pattern may fulfil one or more performance criteria.

In some embodiments, the means for obtaining the at least one compatible set of spatial patterns may comprise means for selecting, from the compatible spatial patterns, at least one further spatial pattern, and means for obtaining further compatible patterns associated with the selected at least one further spatial patterns, wherein the further compatible spatial patterns have at least some overlapping active/unmuted antenna elements or spatial elements with the selected at least one further spatial pattern or in a same subset of reference signal configurations.

In some embodiments, the apparatus may comprise means for transmitting another measurement report on the selected at least one spatial pattern; and means for receiving reference signals on a reference signal resource or resource set corresponding to a spatial pattern having at least some overlapping active/unmuted antenna elements or spatial elements with the selected at least one spatial pattern or in a same subset of reference signal configurations.

In some embodiments, an apparatus of a network device capable of performing the method 500 may comprise means for performing the respective steps of the method 500. The means may be implemented in any suitable form. For example, the means may be implemented in a circuitry or software module.

In some embodiments, the apparatus of the network device is further provided. The apparatus may comprise means for transmitting to a terminal device, a spatial pattern configuration of reference signal transmission from the network device, the spatial pattern configuration being indicative of whether a plurality of spatial patterns have different energy levels; and means for receiving, from the terminal device, a measurement report, wherein the measurement report comprises one or more spatial patterns measured by the terminal device based on the spatial pattern configuration.

In some embodiments, each of the spatial patterns may correspond to one or more of: a reference signal resource; a set of reference signal resources; an identifier of a reference signal resource; a number or set of active/unmuted antenna elements or spatial elements; an arrangement of a set of antenna elements or spatial elements; an energy/power consumption level, an energy saving level, a priority of reference signal for measurement, a number or set of antenna ports; a codebook configuration; a spatial configuration; or a report configuration.

In some embodiments, the different energy levels may comprise at least one of: different numbers of active/unmuted antenna elements or spatial elements; different numbers of inactive/muted antenna elements or spatial elements; different energy consumption levels; different energy saving levels; or different priorities of the reference signal for measurement.

In some embodiments, the spatial pattern configuration may comprise an indicator indicating whether the plurality of spatial patterns have different energy levels.

In some embodiments, the spatial pattern configuration may comprise a set of reference signal configurations, wherein the set of reference signal configurations indicate energy difference information.

In some embodiments, the set of reference signal configurations may comprise at least one subset of reference signal configurations, wherein the at least one subset of reference signal configurations may comprise a list of reference signal configuration, and the subset of reference signal configurations indicate energy difference information.

In some embodiments, the energy difference information may indicate one of: a list of spatial patterns with an increasing priority order according to energy consumption levels; a list of spatial patterns with an decreasing priority order according to energy consumption levels; a list of spatial patterns with an increasing priority order according to numbers of active antenna or spatial elements; a list of spatial patterns with an increasing priority order according to numbers of inactive antenna or spatial elements; power or energy saving levels corresponding to respective spatial patterns; power or energy consumption levels corresponding to respective spatial patterns; priorities of the spatial patterns; respective numbers or information indicative of respective numbers of active/unmuted antenna elements or spatial elements in the spatial patterns; respective numbers or information indicative of respective numbers of inactive/muted antenna or spatial elements in the spatial patterns; or priorities for measurement of the spatial patterns.

In some embodiments, the apparatus may comprise means for transmitting a report request to the terminal device, wherein the report request indicates a set of spatial patterns amongst the plurality of spatial patterns to be measured by the terminal device.

In some embodiments, the spatial pattern configuration may be indicative of the plurality of spatial patterns have a same energy level, and the measurement report may comprise one or more of: at least one best pattern among the plurality of patterns; at least one preferred pattern among the plurality of patterns; or at least one pattern fulfilling one or more performance criteria.

In some embodiments, the spatial pattern configuration may be indicative of the plurality of spatial patterns have different energy levels, and the measurement report comprises the one or more spatial patterns with a lowest energy level.

In some embodiments, the apparatus may comprise means for transmitting compatible information on at least one compatible set of spatial patterns among the plurality of spatial patterns, wherein the at least one compatible set comprises spatial patterns which have at least some overlapping active/unmuted antenna elements or spatial elements but have different energy levels, wherein the one or more spatial patterns reported in the measurement report is determined based on the at least one set of compatible spatial pattern.

In some embodiments, the apparatus may comprise means for receiving another measurement report on at least one spatial pattern from the terminal device; and means for transmit reference signals on a reference signal resource or resource set corresponding to a spatial pattern having at least some overlapping active/unmuted antenna elements or spatial elements with the at least one spatial pattern or in a same subset of reference signal configurations.

The proposed solutions may achieve various advantages over related arts in that it define aspects of CSI reporting framework to enable efficient spatial adaptation procedure. In some embodiments, it decreases the burden at the terminal side, and allow to decrease the overhead in terms of 'sounded' spatial muting patterns in the system.

Figure 7:
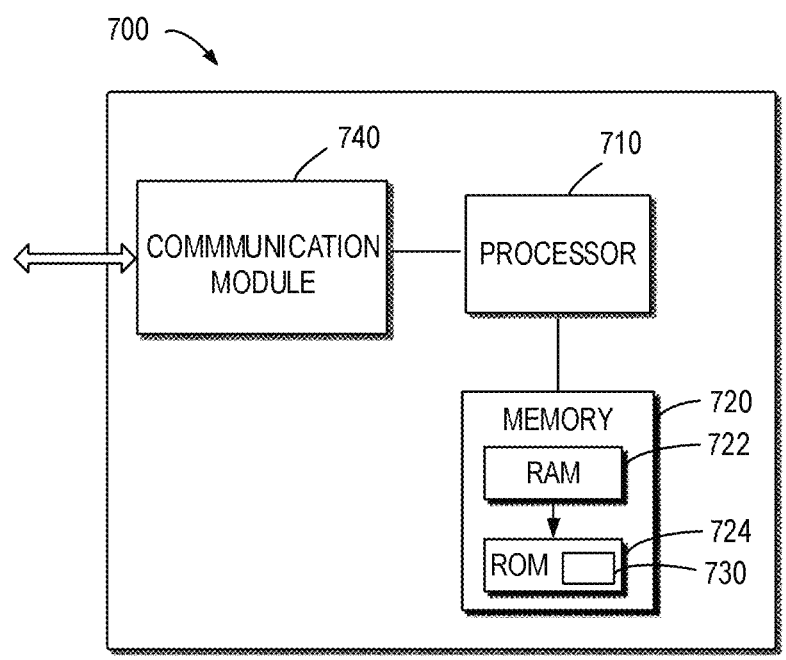
FIG. 7 illustrates an example simplified block diagram of a device that is suitable for implementing embodiments of the present disclosure.

FIG. 7 is a simplified block diagram of a device 700 that is suitable for implementing embodiments of the present disclosure. The device 700 may be provided to implement the communication device, for example the terminal device 110 or the network device 120 as shown in FIG. 1. As shown, the device 700 includes one or more processors 710, one or more memories 740 may be coupled to the processor 710, and one or more transmitters and/or receivers (TX/RX) 740 may be coupled to the processor 710.

The TX/RX 740 is for bidirectional communications. The TX/RX 740 has at least one antenna to facilitate communication. The communication interface may represent any interface that is necessary for communication with other network elements. The communication interface may be hardware or software based interface. For example, the communication interface may be one or more transceivers. The one or more transceivers may be coupled to one or more antennas or antenna ports to wirelessly transmit and/or receive communication signals. The antennas or antenna ports may be the same or different types. The antennas or antenna ports may be located in different positions of an apparatus. The one or more transceivers allow the apparatus to communicate with other devices that may be wired and/or wireless. The transceiver may support one or more radio technologies. For example, the one or more transceivers may include a cellular subsystem, a WLAN subsystem, and/or a Bluetooth™ subsystem. The one or more transceivers may include processors, controllers, radios, sockets, plugs, buffers, or the like circuits to form one or more communication channels to one or more radio frequency units.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a read only memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program so that the device 700 may perform any process of the disclosure as discussed with reference to FIGS. 3 to 5. The embodiments of the present disclosure may also be implemented by hardware or by a combination of software and hardware.

Figure 8:
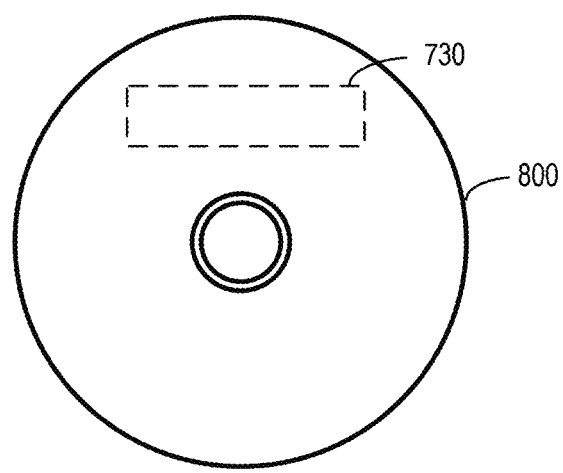
FIG. 8 illustrates an example block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300, 400, or process 500 as described above with reference to FIG. 3, FIG. 4 and FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

The invention claimed is:

1. A terminal device, comprising:
at least one processor; and
at least one memory storing instructions that, when executed by the at least one processor, cause the terminal device at least to:
obtain a spatial pattern configuration of reference signal transmission from a network device, the spatial pattern configuration being indicative of whether a plurality of spatial patterns have different energy levels; and
transmit a measurement report to the network device, wherein the measurement report comprises one or more spatial patterns measured by the terminal device based on the spatial pattern configuration.

2. The terminal device of claim 1, wherein each of the spatial patterns corresponds to one or more of:
a reference signal resource;
a set of reference signal resources;
an identifier of a reference signal resource;
a number or set of active/unmuted antenna elements or spatial elements;
an arrangement of a set of antenna elements or spatial elements;
a number or set of antenna ports;
an energy/power consumption level;
an energy saving level;
a priority of reference signal for measurement
a codebook configuration;
a spatial configuration; or
a report configuration.

3. The terminal device of claim 1, wherein the different energy levels comprise at least one of:
different numbers of active/unmuted antenna elements or spatial elements;
different numbers of inactive/muted antenna elements or spatial elements;
different energy consumption levels;
different energy saving levels; or
different priorities of the reference signal for measurement.

4. The terminal device of claim 1, wherein the spatial pattern configuration comprises an indicator indicating whether the plurality of spatial patterns have different energy levels.

5. The terminal device of claim 4, wherein the spatial pattern configuration comprises a set of reference signal configurations, wherein the set of reference signal configurations indicate energy difference information.

6. The terminal device of claim 5, wherein the set of reference signal configurations comprise at least one subset of reference signal configurations, wherein the at least one subset of reference signal configurations comprise a list of reference signal configuration, and the subset of reference signal configurations indicate energy difference information.

7. The terminal device of claim 6, wherein the energy difference information indicates one of:
a list of spatial patterns with an increasing priority order according to energy consumption levels;
a list of spatial patterns with an decreasing priority order according to energy consumption levels;
a list of spatial patterns with an increasing priority order according to numbers of active antenna or spatial elements;

a list of spatial patterns with an increasing priority order according to numbers of inactive antenna or spatial elements;

power or energy saving levels corresponding to respective spatial patterns;

power or energy consumption levels corresponding to respective spatial patterns;

priorities of the spatial patterns;

respective numbers or information indicative of respective numbers of active/unmuted antenna elements or spatial elements in the spatial patterns;

respective numbers or information indicative of respective numbers of inactive/muted antenna or spatial elements in the spatial patterns; or priorities for measurement of the spatial patterns.

8. The terminal device of claim 1, wherein the plurality of spatial patterns are determined as having a same energy level based on a determination of one or more of:

the plurality of spatial patterns corresponding to a same channel status information-reference signal (CSI-RS) resources or set of CSI-RS resources;

the plurality of spatial patterns corresponding to a same reporting configuration;

the plurality of spatial patterns corresponding to different CSI-RS resources or different sets of CSI-RS but with a same number of ports;

the plurality of spatial patterns corresponding to same N1 and N2 parameters representing numbers of active/unmuted antenna elements along horizontal and vertical directions respectively;

the plurality of spatial patterns corresponding to a same codebook or spatial or report configuration;

the plurality of spatial patterns corresponding to same codebook subset restriction (CBSR);

the plurality of spatial patterns being associated directly or indirectly with a variable indicating that they have a same number of active/unmuted antenna elements or spatial elements; or an indicator in the spatial pattern configuration indicates the plurality of spatial patterns have a same energy level.

9. The terminal device of claim 1, wherein the terminal device is further caused to:

receive a report request from the network device, wherein the report request indicates a set of spatial patterns amongst the plurality of spatial patterns to be measured by the terminal device.

10. The terminal device of claim 1, wherein the spatial pattern configuration is indicative of the plurality of spatial patterns have a same energy level, and the measurement report comprises one or more of:

at least one best pattern among the plurality of patterns;

at least one preferred pattern among the plurality of patterns; or at least one pattern fulfilling one or more performance criteria.

11. The terminal device of claim 1, wherein the spatial pattern configuration is indicative of the plurality of spatial patterns have different energy levels, and the measurement report comprises the one or more spatial patterns with a lowest energy level.

12. The terminal device of claim 11, wherein the terminal device is further caused to:

obtain compatible information on at least one compatible set of spatial patterns among the plurality of spatial patterns, wherein the at least one compatible set comprises spatial patterns which have at least some overlapping active/unmuted antenna elements or spatial elements but have different energy levels, wherein the one or more spatial patterns reported in the measurement report is determined based on the at least one set of compatible spatial patterns.

13. The terminal device of claim 12, wherein the compatible information on at least one compatible set of spatial patterns is obtained from the network device.

14. The terminal device of claim 12, wherein the compatible information on at least one compatible set of spatial patterns is obtained by the terminal device based on the spatial pattern configuration.

15. A network device, comprising:

at least one processor; and at least one memory storing instructions that, when executed by the at least one processor, cause the network device to:

transmit, to a terminal device, a spatial pattern configuration of reference signal transmission from the network device, the spatial pattern configuration being indicative of whether a plurality of spatial patterns have different energy levels; and receive, from the terminal device, a measurement report, wherein the measurement report comprises one or more spatial patterns measured by the terminal device based on the spatial pattern configuration.

16. The network device of claim 15, wherein each of the spatial patterns corresponds to one or more of:

a reference signal resource;

a set of reference signal resources;

an identifier of a reference signal resource;

a number or set of antenna elements or spatial elements;

an arrangement of a set of antenna elements or spatial elements;

an energy/power consumption level;

an energy saving level;

a priority of reference signal for measurement a number or set of antenna ports;

a codebook configuration;

a spatial configuration; or a report configuration.

17. The network device of claim 15, wherein the different energy levels comprise at least one of:

different numbers of active/unmuted antenna elements or spatial elements;

different numbers of inactive/muted antenna elements or spatial elements;

different energy consumption levels;

different energy saving levels; or different priority of the reference signal for measurement.

18. A method for a terminal device comprising:

obtaining a spatial pattern configuration of reference signal transmission from a network device, the spatial pattern configuration being indicative of whether a plurality of spatial patterns have different energy levels; and transmitting a measurement report to the network device, wherein the measurement report comprises one or more spatial patterns measured by the terminal device based on the spatial pattern configuration.

19. The method of claim 18, wherein each of the spatial patterns corresponds to one or more of:

a reference signal resource;

a set of reference signal resources;

an identifier of a reference signal resource;

a number or set of active/unmuted antenna elements or spatial elements;

an arrangement of a set of antenna elements or spatial elements;
a number or set of antenna ports;
an energy/power consumption level;
an energy saving level;
a priority of reference signal for measurement
a codebook configuration;
a spatial configuration; or
a report configuration.

20. The method of claim 18, wherein the different energy levels comprise at least one of:
different numbers of active/unmuted antenna elements or spatial elements;
different numbers of inactive/muted antenna elements or spatial elements;
different energy consumption levels;
different energy saving levels; or
different priorities of the reference signal for measurement.

* * * * *